United States Patent [19]

Thompson et al.

[11] Patent Number: 4,902,174
[45] Date of Patent: Feb. 20, 1990

[54] MAIN LINE TAPPING APPARATUS

[75] Inventors: Clifford F. Thompson, Bradford; Lawrence F. Thompson, Tottenham, both of Canada

[73] Assignee: Cliffside Utility Contractors Ltd., Scarborough, Canada

[21] Appl. No.: 333,970

[22] Filed: Apr. 6, 1989

[51] Int. Cl.⁴ ............................................. B23B 47/18
[52] U.S. Cl. ................................... 408/101; 408/102; 408/103; 408/111; 408/137; 408/138
[58] Field of Search ................... 408/14, 15, 72 B, 79, 408/97, 98, 99, 101, 102, 103, 110, 113, 111, 136, 137, 138

[56] References Cited

U.S. PATENT DOCUMENTS

| 160,952 | 3/1875 | Quinn | 408/138 |
| 3,847,501 | 11/1974 | Doty | 408/101 |
| 3,870,431 | 3/1975 | Luckenbill et al. | 408/138 |

FOREIGN PATENT DOCUMENTS

| 924912 | 2/1955 | Fed. Rep. of Germany | 408/111 |
| 1117971 | 11/1961 | Fed. Rep. of Germany | 408/110 |

Primary Examiner—Daniel Howell
Attorney, Agent, or Firm—Shoemaker and Mattare

[57] ABSTRACT

An apparatus for tapping live pipes includes an adaptor for affixing to a pipe, the adaptor including a valve for closing off any opening cut into the pipe. The internal drive shaft has a plurality of transverse apertures spaced apart along its length, so that it can be adjusted longitudinally to different positions with respect to the apparatus which grips the drive shaft and urges it toward the pipe during cutting. This avoids the necessity of designing a plurality of apparatuses which are adapted to cutting bits and devices of different lengths.

8 Claims, 2 Drawing Sheets

MAIN LINE TAPPING APPARATUS

This invention relates generally to an apparatus for drilling or cutting a hole or opening in a vessel such as a pipe or the like, while preventing any substantial flow of fluid into or out of the vessel. More particularly, this invention relates to an apparatus for tapping live pipes and the like, i.e. pipes containing a fluid under pressure.

BACKGROUND OF THIS INVENTION

The expressions "live tapping" and "hot tapping" refer to the cutting or drilling of a hole through the wall of a vessel or a pipe while the same contains a fluid under pressure. This procedure is typically performed in those circumstances where it is desired to make a connection to the pipe without taking the pipe out of operation and without removing pressurized fluid from it. This kind of tapping, for example, is often utilized for connecting into a pipeline carrying a domestic water supply, since it would be a substantial inconvenience to have to shut down the entire line.

Live tapping is typically carried out by first welding a stub pipe or a split T to the pipe, and then mounting a tapping valve on the stub or on the branch of the T. A tapping apparatus can be mounted on the valve with its cutter running through the open valve to cut the opening in the pipe. After the opening has been cut, the cutter is retracted and the valve closed, whereupon the tapping apparatus can be removed without any substantial leakage of fluid into or out of the pipe. It is also known to utilize a "saddle" which surrounds the pipe and provides a recessed area containing a flat seal. The saddle is adapted to be tightened around the pipe and has a threaded collar or the like projecting away from the pipe at the location of the seal, as well as an opening such that a cutting device or bit can pass through the opening to cut into the pipe.

Currently, the apparatus which controls the cutting device and which is threadably attached to the saddle or equivalent, must be sized in such a way that it is adapted to the particular cutting device. Generally it is found that an apparatus suitable for a short cutting device such as a circle cutter is inappropriate for use with an elongated drill bit. The problem is largely due to the fact that a shaft that is small enough to pass through small diameter valves and place a cutting device in position against the pipe would not be sufficiently strong to operate it. Therefore, elongated drills that will contact the pipe through the valve are used.

GENERAL DESCRIPTION OF THIS INVENTION

In view of the foregoing, it is an object of one aspect of this invention to provide an apparatus for tapping live pipes, incorporating a substantial degree of adjustability, such that the same apparatus can be used for different sizes and kinds of cutting devices.

More particularly, this invention provides an apparatus for tapping live pipes and the like, the apparatus comprising:

adaptor means constructed so that it can be affixed to a pipe being tapped, said adaptor means including a threaded collar which, when the adaptor means is affixed to a pipe, projects substantially perpendicularly away from the axis of the pipe, the adaptor defining an internal passage through which a cutting device can be passed, the adaptor means also incorporating closure means by which said internal passage can be closed to prevent the escape of fluid from the pipe, an adjusting screw having at one end a threaded portion adapted to engage said threaded collar of the adaptor means, the adjusting screw further having a smooth internal bore and a threaded exterior concentric with said bore, an elongate adjusting nut having at one end an internal thread engaging said threaded exterior of the adjusting screw, whereby rotation of the adjusting nut with respect to the adjusting screw causes the former to move axially of the latter, a stop sleeve having an internal bore which is aligned with the bore of the adjusting screw and which has substantially the same inner diameter as the inner bore of the adjusting screw, the stop sleeve being positioned at least partly within the other end of the adjusting nut, retention means restraining the stop sleeve against movement away from said adaptor means with respect to the adjusting nut, but permitting rotation of the stop sleeve with respect to the adjusting nut, a cylindrical drive shaft snugly but slidably received in the bores of the stop sleeve and the adjusting screw, the drive shaft having a plurality of diametral boreholes at spaced-apart locations therealong, the stop sleeve having a pair of aligned transverse apertures located to allow registry with any one of said diametral boreholes, a pin sized to pass simultaneously through said pair of apertures and one of said diametral boreholes, a cutting device affixed to the end of the drive shaft which is directed toward the pipe, first rotatable means for rotating said adjusting nut with respect to said adjusting screw, and second rotatable means for rotating the drive shaft.

GENERAL DESCRIPTION OF THE DRAWINGS

One embodiment of this invention is illustrated in the accompanying drawings, in which like numerals denote like parts throughout the several views, and in which:

FIG. 3 is a partial perspective view of the apparatus of FIG. 1, showing its adaptation to a drill bit.

DETAILED DESCRIPTION OF THE DRAWINGS

Figure 2:
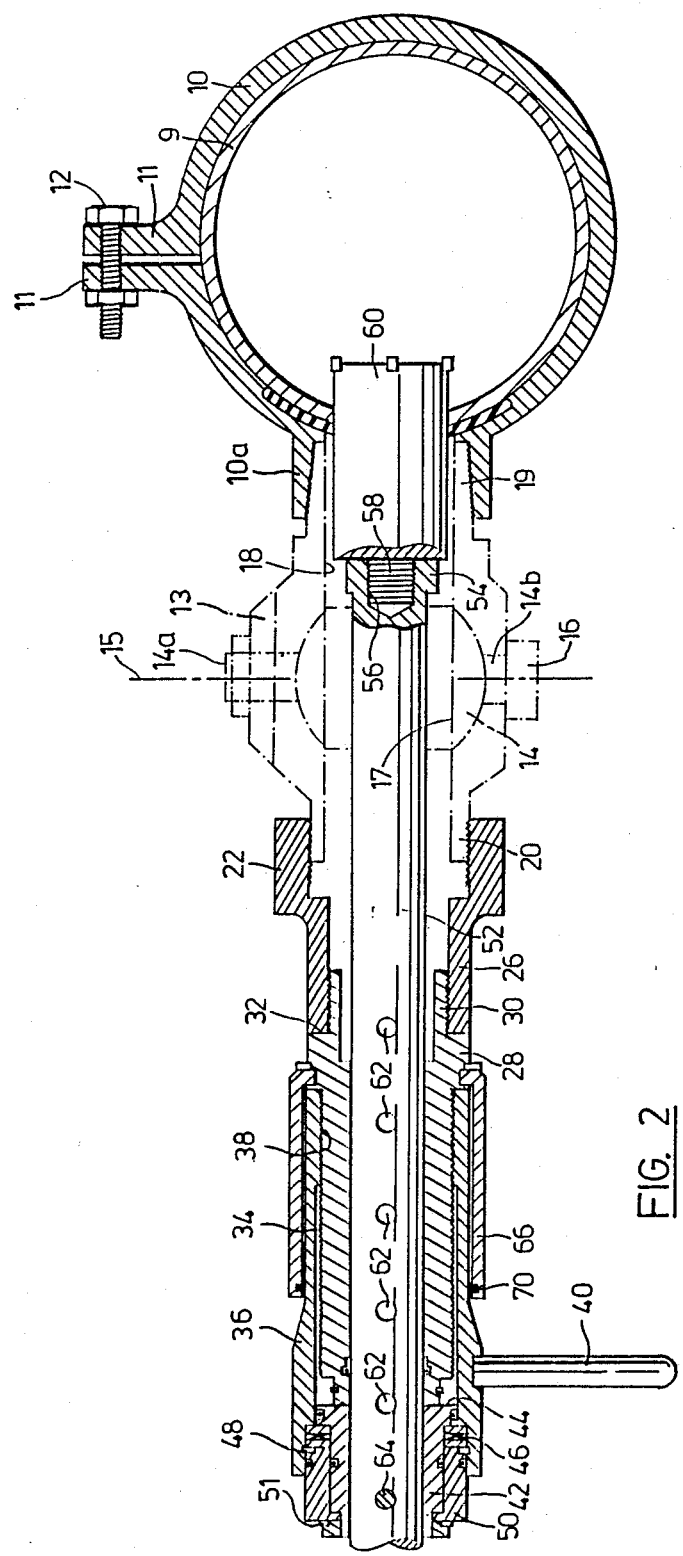
FIG. 2 is an axial sectional view through the apparatus of FIG. 1.

Referring first to FIG. 2, a live pipe is shown in cross-section at 9. Around the pipe is clamped a saddle 10 having radially projecting, apertured flanges 11. A bolt and nut combination 12 presses the flanges 11 toward each other, thus tightening the saddle 10 into position. The saddle 10 incorporates an internally threaded collar 10a projecting radially away from the pipe 9.

Threaded tightly into the collar 10a is a valve 13 which operates in the manner of a ball valve. More specifically, the valve 13 incorporates an internal rotary element 14 having two axially aligned stub shafts 14a and 14b which lie within appropriate bores in the valve 13, and allow the rotary element 14 to rotate about a rotary axis identified by the numeral 15. Integral with the stub shaft 14b is a faceted head 16 which can be gripped with a wrench or other suitable tool, in order to rotate the rotary element 14. As with all typical ball valves or similar valves, the rotary element 14 has a transverse opening 17 which, when the rotary element 14 is in one position, is aligned with a central bore 18 through the valve 13. The bore 18 extends between a first externally threaded end 19 and a second externally threaded end 20. As can be seen in FIG. 2, the end 19 of the valve 13 has a tapering or pipe thread fit with the collar 10a, whereas the end 20 of the valve 13 does not taper. Threaded to the end 20 is a short adaptor 22 having a first end 24 which is internally threaded, and a second end 26 which is also internally threaded, with a smaller diameter than the inside diameter of the end 24.

An adjusting screw 28 includes an integral collar 30 which is externally threaded and which engages the end 26 of the short adaptor 22. The adjusting screw 28 includes a shoulder 32 which abuts the leftward end of the short adaptor 22.

The adjusting screw 28, as can be seen particularly in FIG. 2, has an external thread 34 throughout most of its length. Threadably engaging the adjusting screw 28 is an adjusting nut 36 which has at the rightward end an internal thread 38 which engages the threaded exterior of the adjusting screw 28, whereby rotation of the adjusting nut 36 with respect to the adjusting screw 28 causes the former to move axially of the latter. In the embodiment shown, the adjusting nut 36 has three rods 40 extending radially away from the adjusting nut 36 at intervals at 120°, welded in place. It will thus be appreciated that, when the rods 40 are rotated about the central axis of the apparatus shown in FIG. 2, there is relative axial movement between the adjusting nut 36 and the adjusting screw 28.

Looking at the left of FIG. 2, there is provided a stop sleeve 42 with an internal bore that is aligned with the bore of the adjusting screw 28, the internal bore having substantially the same diameter as the bore of the adjusting screw. It will further be noted that the stop sleeve 42 is positioned at least partly within the leftward end of the adjusting nut 36.

Means is provided for restraining the stop sleeve against movement away from the pipe 9 with respect to the adjusting nut, while permitting rotation of the stop sleeve with respect to the adjusting nut. The retention means, in the embodiment illustrated, incorporates an outwardly projecting annular flange 44 on the stop sleeve 42, along with a thrust bearing 46 which lies adjacent the annular flange 44 and within the leftward end of the adjusting nut 36. The thrust bearing 46 is retained by a C-clip 48 with respect to the adjusting nut 36.

Still referring to the leftward end of FIG. 2, the apparatus additionally includes a thrust collar 50 surrounding the stop sleeve 42 and lying partly within the leftward end of the adjusting nut 36. The thrust collar 50 protects the thrust bearing 46 from the environment, and allows combined and independent movement of the adjusting nut 36 and the drive shaft 52. It is driven radially by stop sleeve 42 and held axially by a C-clip 51.

A cylindrical drive shaft 52 passes snugly but slidably through the bores of the stop sleeve 42 and the adjusting screw 28. As can be seen, the drive shaft 52 has at its inner or rightward end an enlarged portion 54, and an internally threaded bore 56 for receiving a threaded end 58 of a cutting device 60. The drive shaft 52 also has a plurality of diametral boreholes 62 at spaced-apart locations therealong.

Both the stop sleeve 42 and the thrust collar 50 have a pair of aligned transverse apertures located in such a position as to allow registry with any one of the diametral boreholes 62, depending upon the longitudinal position of the drive shaft 52.

A pin 64 is provided (see FIG. 1) and is sized to pass simultaneously through the apertures of the stop sleeve 42 and the thrust collar 50, and one of the diametral boreholes 62. With the pin in place, it will be understood that the drive shaft 52 is fixed with respect to the stop sleeve 42 and the thrust collar 50, whereby all three of these elements must rotate together and must move axially together.

A thread guard 66 is secured to the adjusting screw 28 at its rightward end, and extends cylindrically parallel with the adjusting screw 28 in the direction remote from the pipe 9. A seal 70 prevents the ingress of dust, moisture, etc. into the space between the thread guard 66 and the adjusting nut 36, thus fully protecting the external threads on the adjusting screw 28.

Looking at FIG. 3, it will be seen that the drive shaft 52 is adapted to receive a drill bit 72, which also has a threaded stub shaft adapted to be screwed into the threaded bore 56 at the rightward end of the drive shaft 52 (compare FIGS. 2 and 3).

Figure 1:
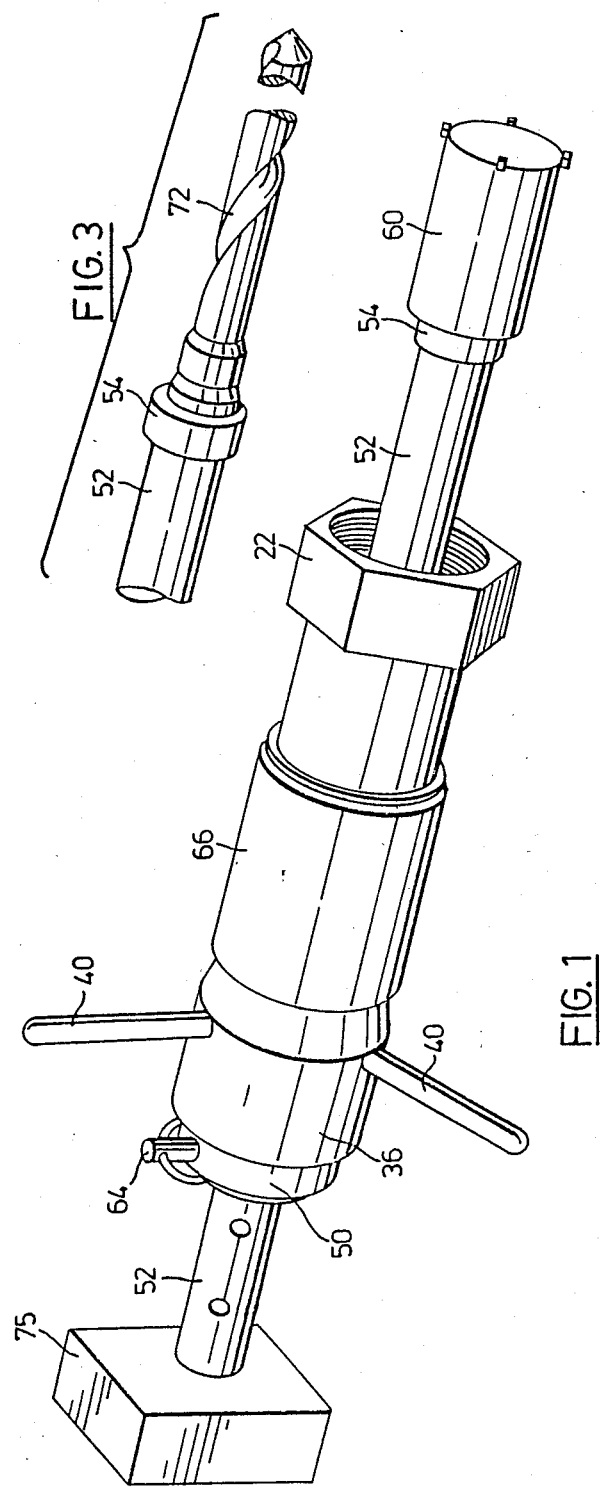
FIG. 1 is a perspective view of an apparatus constructed in accordance with this invention.

In FIG. 1, a rotatable means for rotating the drive shaft 52 is shown schematically at 75. It is to be understood that the drive shaft 52 could be rotated either mechanically by a powered device, or alternatively could be rotated manually.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. An apparatus for tapping live pipes and the like, the apparatus comprising:
   adaptor means constructed so that it can be affixed to a pipe being tapped, said adaptor means including a threaded collar which, when the adaptor means is affixed to a pipe, projects substantially perpendicularly away from the axis of the pipe, the adaptor defining an internal passage through which a cutting device can be passed, the adaptor means also incorporating closure means by which said internal passage can be closed to prevent the escape of fluid from the pipe,
   an adjusting screw having at one end a threaded portion adapted to engage said threaded collar of the adaptor means, the adjusting screw further having a smooth internal bore and a threaded exterior concentric with said bore,
   an elongate adjusting nut having at one end an internal thread engaging said threaded exterior of the adjusting screw, whereby rotation of the adjusting nut with respect to the adjusting screw causes the former to move axially of the latter,
   a stop sleeve having an internal bore which is aligned with the bore of the adjusting screw and which has substantially the same inner diameter as the inner bore of the adjusting screw, the stop sleeve being positioned at least partly within the other end of the adjusting nut,
   retention means restraining the stop sleeve against movement away from said adaptor means with respect to the adjusting nut, but permitting rotation of the stop sleeve with respect to the adjusting nut, a cylindrical drive shaft snugly but slidably received in the bores of the stop sleeve and the adjusting screw, the drive shaft having a plurality of diametral boreholes at spaced-apart locations therealong the stop sleeve having a pair of aligned transverse apertures located to allow registry with any one of said diametral boreholes, a pin sized to pass simultaneously through said pair of apertures and one of said diametral boreholes, a cutting device affixed to the end of the drive shaft which is directed toward the pipe, first rotatable means for rotating said adjusting nut with respect to said adjusting screw, and second rotatable means for rotating the drive shaft.

2. The apparatus claimed in claim 1, in which said adaptor means includes a saddle for encircling the pipe, and in which said closure means comprises a valve through which said cutting device passes to have access to the pipe, the valve being capable of closing.

3. The apparatus claimed in claim 1, in which said stop sleeve has an outwardly projecting annular flange, the apparatus further including a compression washer adjacent said annular flange and retained with respect to the adjusting nut by a C-clip.

4. The apparatus claimed in claim 3, which further includes a thrust collar surrounding the stop sleeve and partly within the other end of the adjusting nut, the thrust collar protecting the compression washer from the environment, the thrust collar further having apertures aligned with said transverse apertures on the stop sleeve.

5. The apparatus claimed in claim 1, in which said first rotatable means comprises a plurality of rods fixed to and and projecting radially away from said adjusting nut.

6. The apparatus claimed in claim 4, in which said adaptor means includes a saddle for encircling the pipe, and in which said closure means comprises a valve through which said cutting device passes to have access to the pipe, the valve being capable of closing after withdrawal of the cutting device.

7. The apparatus claimed in claim 6, in which said stop sleeve has an outwardly projecting annular flange, the apparatus further including a compression washer adjacent said annular flange and retained with respect to the adjusting nut by a C-clip.

8. The apparatus as claimed in claim 7, in which said first rotatable means comprises a plurality of rods fixed to and projecting radially away from said adjusting nut.

* * * * *